United States Patent Office 3,549,425
Patented Dec. 22, 1970

3,549,425
PASSIVATION OF METALS
Marnell A. Segura and Leo Broussard, Baton Rouge, La., assignors to Esso Research and Engineering Company, a corporation of Delaware
No Drawing. Filed Jan. 10, 1968, Ser. No. 696,712
Int. Cl. C23f 7/04
U.S. Cl. 148—6.35                             6 Claims

ABSTRACT OF THE DISCLOSURE

This invention relates to the surface treatment of metals to form protective films or layers. Ferrous metals are oxidized to form surface films of wustite, and the so-treated metal is then quenched in an inert atmosphere and cooled sufficiently to disproportionate a major portion of the wustite to magnetic oxide of iron. The magnetic oxide of iron film is impervious, and quite stable, and hence forms a barrier which protects the unexposed metal lying beneath the film from further oxidation.

---

It is essential to protect certain metals against environmental attack. The protection of porous, compacted forms of metals (briquettes), and powdered metals, offers special problems due to their relatively high chemical reactivity. A major factor is that briquettes and powders offer very large surface areas, thus greatly increasing the actual exposure to penetration by the atmosphere, moisture, corrosive gases, fumes and impurities. Further, certain metals are also very highly "active" and readily chemically react when exposed to various environments. Ferrous metals, especially iron produced in direct iron ore reduction processes are illustrative. These metals have presented certain handling problems, and occasionally dangers, which have tended to suppress their full commercial utilization.

There is increasing interest in processes for direct reduction of ore (reduction without melting), particularly iron ore. In direct iron ore reduction processes, particulate iron ore is contacted with reducing gas at elevated temperatures for sufficient time to produce a particulate metallic iron product. Iron ores, which are reduced at temperatures below the softening point of iron, generally exhibit, even after cooling, pyrophorism, which is a tendency for the iron to rapidly, or instantaneously, reoxidize on exposure to air, often with violent reaction. On the other hand, reduced iron subsequently treated to lessen pyrophoricity, or if formed by reduction at temperatures above the softening point of iron, may be less violently reactive but, nonetheless, there are some extremely difficult problems associated even with the handling and use of these products.

At a plant site, it is often essential that a reduced iron product, even after carefully cooling, be stored, or shipped, in large quantities. There is, however, a tendency for the particulate reduced iron product to back-oxidize, often relatively rapidly, especially where it must be stored for long periods, or shipped under relatively adverse conditions. This is so even where the iron powder is first aggregated into porous forms, as when compacted into the form of briquettes or extruded as rigid solid shapes. Thus, e.g., even in the presence of atmospheric moisture, there is an acute tendency for the reduced iron product to back-oxidize, this to the chagrin of potential users who desire a highly metallic product. There is, however, an even more severe problem. Thus, where a reduced iron product, such as briquettes, has been placed in piles and stored for relatively short periods, intensely hot fires have resulted. Obviously, back-oxidation per se is bothersome enough, but spontaneous fires could be catastrophic under certain circumstances.

It is believed that a porous or particulate reduced iron product, when dampened or wetted, as by atmospheric moisture, rain or spray, can liberate hydrogen. It is also known that oxygen, e.g., atmospheric oxygen, can produce back-oxidation of the metal. Hydrogen can, under certain circumstances, ignite spontaneously. Two reactions are believed primarily responsible for the oxidation, and spontaneous ignition, of a reduced iron product. A first reaction, which is only slightly exothermic, involves reaction between iron and water and can be represented by the equation:

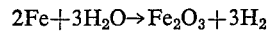
$$2Fe + 3H_2O \rightarrow Fe_2O_3 + 3H_2$$

The second reaction, which is highly exothermic, involves reaction between iron and oxygen and can be represented by the following equation:

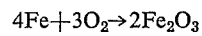
$$4Fe + 3O_2 \rightarrow 2Fe_2O_3$$

It is thought that fires may be caused from circumstances wherein the geometry of the stored or piled product is such that the heat generated by the reactions cannot be sufficiently rapidly dissipated. Eventually, the temperature from the hydrogen reaction builds up to a point where the air oxidation of iron becomes the controlling reaction. The latter reaction, being strongly exothermic, produces ignition of the hydrogen while the liberated heat sustains and increases the rate of the oxidation reaction. Under these conditions, the reactions can continue until essentially all of the metallic iron has been rapidly converted back to iron oxides.

It has recently been discovered that metals, particularly ferrous metals, can be passivated by treatment involving a sequence of oxidation steps to form protective surface films. In U.S. Pat. 3,479,232, it is disclosed, e.g., that various particulate and compacted forms of reduced iron can be sequentially oxidized, in a first step, to form a wustite surface film, generally defined as one having a relatively high ratio of $Fe^{2+}$ cations-to-$Fe^{3+}$ cations. In a subsequent, or second, step the so-treated metal is cooled and further oxidized to convert the wustite film into an inverse spinel form of magnetite which renders the metal beneath the film impervious to penetration and attack by the atmosphere, moisture, corrosive gases, or the like.

The present invention is based on the discovery that the wustite film, once formed, can also be quenched or cooled in an inert atmosphere to cause disproportionation of the ferrous oxide to yield an inverse spinel form of magnetic oxide of iron. Though this reaction proceeds through an entirely different mechanism, the film which is formed is also impervious to penetration and attack by the atmosphere, moisture, corrosive gases, or the like.

It is known that certain metals, e.g., Group VIII metal of the Periodic Chart of the Elements, are capable of exhibiting more than one valence state, or state wherein an element thereof can exist in several states of oxidation. Such polyvalent metals, e.g., iron, are usually considered as capable of forming stoichiometric compounds of ferrous oxide (FeO or wustite), magnetic oxide of iron ($Fe_3O_4$ or magnetite) and ferric oxide ($Fe_2O_3$ or hematite). Such ideal states, however, are gross over-simplifications, for iron oxides generally are far more complex structures. This is particularly so in gas reduction systems. Hematite, the highest valence state for elemental iron, is thus a chemical compound of the normal stoichiometric type. The compound satisfies a valence of three for iron and two for oxygen. Wustite, at least in theory, might be considered an oxide compound wherein iron has a valence of two. Ferrous oxide, however, is quite unstable and probably has never been isolated. It exists in theory at a temperature of about 1058° F., and above this temperature the composition is approximated by a solution of ferrous oxide richer in oxygen than in FeO. These solutions, deficient in iron as contrasted with FeO, are known as wustite, i.e., $FeO_x$. The subscript or letter $x$ in the formula $FeO_x$ is greater than 1.00 and ranges as high as about 1.33.

Ferrous oxide contains one atom of iron for each atom of oxygen. It contains 32 $Fe^{2+}$ cations per unit cell, and can be written $FeO_{1.00}$. Wustite, on the other hand, is deficient in $Fe^{2+}$ cations. The deficiency, however, causes no structural complications in the unit cell because electrical neutrality in the unit cell is maintained by addition of two $Fe^{3+}$ cations for each deficiency of three $Fe^{2+}$ cations. It is thus believed that wustite $(FeO_x)$ ranges from one containing 32 $Fe^{2+}$ cations $(FeO_{1.00})$ per unit cell to one containing only 8 $Fe^{2+}$ $(FeO_{1.33})$ cations per unit cell, and conversely from one containing no $Fe^{3+}$ cations $(FeO_{1.00})$ per unit cell to one containing 16 $Fe^{3+}$ cations $(FeO_{1.33})$ per unit cell. The relationship between $FeO_x$, weight percent metallic iron, and types of $Fe^{2+}$ and $Fe^{3+}$ cations per unit cell can be conveniently summarized by reference to the following table:

OXIDATION OF WUSTITE

| $x$ in $FeO_x$ | Weight percent Fe | Cations/unit cell [1] | | Ratio $Fe^{2+}$/$Fe^{3+}$ per unit cell |
| --- | --- | --- | --- | --- |
| | | $Fe^{3+}$ | $Fe^{2+}$ | |
| 1.00 | 77.7 | 0 | 32 | 32/0 |
| 1.03 | 77.2 | 2 | 29 | 29/2 |
| 1.07 | 76.6 | 4 | 26 | 26/4 |
| 1.10 | 76.0 | 6 | 23 | 23/6 |
| 1.14 | 75.3 | 8 | 20 | 20/8 |
| 1.19 | 74.6 | 10 | 17 | 17/10 |
| 1.23 | 73.9 | 12 | 14 | 14/12 |
| 1.28 | 73.1 | 14 | 11 | 11/14 |
| 1.33 | 72.3 | 16 | 8 | 8/16 |

[1] Unit cell contains 64 tetrahedral sites and 32 octahedral sites.

In passivating the surface of a metal, the first step is to oxidize under controlled conditions to form a surface film of wustite. To accomplish this, the metallic iron is heated, in an oxidizing atmosphere, to a temperature ranging above about 1058° F., and preferably to a temperature ranging from about 1200° F. to about 1600° F. Preferably, a film is formed which ranges in thickness from about 20 A. (angstrom units) to about 10,000 A., and preferably from about 20 A. to about 100 A. The thinner films are preferable, and the thickness thereof should range only a very small fraction of the thickness of the base metal upon which the film is formed.

Ferrous oxide or $FeO_{1.00}$ provides a unit cell of 32 $Fe^{2+}$ cations and 32 $O^{-2}$ ions, which is electrically neutral. It disproportionates according to the following formula:

$$4FeO \rightarrow Fe + Fe_3O_4$$

In other words, four moles of ferrous oxide are converted into one mole of iron and one mole of magnetic oxide of iron. Since $FeO_{1.00}$ is difficult to obtain, or owes its existence primarily to theory, the film which is formed will be wustite, e.g., $FeO_{1.14}$. A unit cell of wustite of this composition contains 32 oxygen atoms and 28 iron atoms. Electrical neutrality is maintained, however, because the iron atoms exist as 8 $Fe^{3+}$ cations and 20 $Fe^{2+}$ cations. Upon quenching in an inert atmosphere, the 8 $Fe^{3+}$ cations, along with 4 $Fe^{2+}$ cations and 16 $O^{-2}$ ions are converted into $Fe_3O_4$. Subsequently, the remaining 16 $Fe^{2+}$ cations and 16 $O^{-2}$ ions disproportionate to provide an equimolar mixture of metallic iron and magnetic oxide of iron. Hence, the disproportionation is step-wise and metallic iron is formed only after the $Fe^{3+}$ cations are converted to magnetic oxide of iron.

Applicants have utilized this discovery and have found that metals can be oxidized to form films within the lowest valence state of the metal. The films can then be disproportionated by cooling in an inert atmosphere to form films or surface coatings which are strongly resistant to back-oxidation. For example, metallic iron can be oxidized to form films of wustite on the base metal, and the wustite can then be disproportionated in an inert atmosphere to provide a film containing an inverse spinel form of magnetite. In the formation of the wustite film, it is important to use an oxidizing gas of just sufficient oxidation potential and at suitable conditions to allow just sufficient exposure to form a film of desired thickness.

Particulate reduced iron products from direct iron ore reduction processes have been found particularly susceptible to treatment in accordance with this invention. In such processes, oxidic iron ores, i.e., ores containing or consisting essentially of iron oxides, are generally gradually progressively reduced with various reducing gases, generally with hydrogen or carbon monoxide, or mixtures of these and other gases. In a particularly preferred form of practicing the present invention, the product from a fluidized iron ore reduction process is utilized. In such process, the iron oxides are initially staged in a series of beds, stages or zones, and directly contacted and fluidized by ascending gases, and reduced at the same or at different elevated temperatures. The ore is generally reduced in an initial bed, or beds, from, e.g., ferric oxide to magnetite to ferrous oxide and, finally in another bed, or beds, from ferrous oxide to a product ranging from about 80 to about 95 percent, and higher, metallization, dependent upon the anticipated use.

The reduced iron product from such processes can be withdrawn and, depending upon the temperature of withdrawal, heated or cooled in a reducing, or substantially inert, atmosphere to the desired temperature for passivation.

The product is treated at temperatures ranging from about 1100° F. to about 1500° F., and preferably at temperatures ranging from about 1200° F. to about 1400° F. for sufficient periods of time, ranging generally from about ½ minute to about 20 minutes, and preferably from about 1 minute to about 5 minutes, to produce wustite films of the desired quality and thickness. Pursuant to such conditions, reducing gases of hydrogen or carbon monoxide, or mixture thereof, are found satisfactory if steam be injected therein to provide the desired oxidation potential for conversion of the metallic iron to the desired wustite form.

After formation of the wustite film, the wustite is disproportionated by quenching or cooling the product in an inert atmosphere to a temperature ranging from about 400° F. to about 1100° F., and preferably from about 600° F. to about 800° F. Disproportion does not occur above about 1100° F., nor at temperatures below about 400° F. A rapid quench is preferred, and a high degree of disproportionation is achieved for most reduced products by quenching to disproportionation temperature in from about one-half to about 15 minutes, and preferably in from about 2 to about 5 minutes.

In some circumstances it is desired that disproportionation not be carried to completion. Thus, disproportionation can be initiated and then interrupted prior to formation of metallic iron by rapidly quenching and dropping the temperature of the product below 400° F. Considering $FeO_{1.14}$ again, e.g., the first step in the disproportionation involves formation of $Fe_3O_4$ from 8 $Fe^{3+}$ cations, 4 $Fe^{2+}$ cations and 16 $O^{-2}$ anions. If the reaction is halted at this point, the remaining 16 $Fe^{2+}$ cations and 16 $O^{-2}$ anions do not disproportionate and no metallic iron is formed. On the other hand, a mild oxidation treatment at this point in time will convert the 16 $Fe^{2+}$ cations and 16 $O^{-2}$ anions to an inverse spinel form of magnetite rather than into an equimolar mixture of metallic iron and magnetic oxide of iron. Such treatment can be as prescribed in U.S. Pat. 3,479,232, supra.

In the following examples, various hematite ores are charged to the top or initial stage of a reactor containing a series of four fluidized beds and progressively reduced, upon descent from one bed to the next of the series, by treatment with an ascending gaseous mixture of hydrogen and carbon monoxide at temperatures ranging from an initial 900° F. to 1500° F. in the final fluidized bed. The different particulate reduced iron products are withdrawn from the final stage of the reactor and portions thereof treated in an auxiliary vessel.

EXAMPLE I

The individual portions of ore are fluidized and subjected, at 1350° F., to treatment for one hour with a mixture of 50 percent hydrogen–50 percent steam to produce a wustite film. The portions are then stripped at 1350° F. with dry nitrogen for fifteen minutes to assure removal of the reducing atmosphere.

The treated portions of product are then quenched to a disproportionation temperature of 750° F. in three minutes, and maintained at this temperature for an additional forty-five minutes and then cooled quickly, in about one minute, to ambient temperature. The extent of disproportionation is measured by Mossbauer spectrometry.

The results are as shown in the following table wherein the letters A through F represent commercially available hematite ores from various sections of the world. The ores are listed, from A, beginning with those which are the easiest to reduce via direct reduction processes. Ore A is, for example, a natural hematite, and ore F is a specular hematite.

| Original ore: | Percent wustite disproportionated |
|---|---|
| A | 35 |
| B | 40 |
| C | 50 |
| D | 55 |
| E | 70 |
| F | 95 |

It is thus seen that the disproportionation tendency differs for different ores. The disproportionation tendency is greatest at 750° F. for those ores listed at the bottom of the table, and conversely is lesser for those ores listed at the top of the table. Ores which are the most difficult to initially reduce are the most susceptible to passivation via disproportionation.

To determine the degree of passivity of the so-treated product, analyses are performed to measure the amount of oxygen consumed and hydrogen generated. The measurements are calculated on the basis of standard cubic feet of oxygen consumed or hydrogen generated per hour per ton of reduced iron product. Analyses are also performed on an untreated portion of the product and comparisons of the results are made. In accordance therewith, it is found that relatively little oxygen is consumed or hydrogen liberated by the passivated metal. This is so even where the percent of disproportionation is relatively low. This, however, is in sharp contrast with similar tests conducted on the unpassivated product.

In fact, even after the passivated powder is fed into the nip of a double roll press and formed, at about 900° F., into pillow-shaped briquettes (3¾ x 1½ x 9/16 inches in size) having a density approximating 5, the briquettes show very low activity.

EXAMPLE II

In fact, when piles of the passivated and unpassivated briquettes are formed and subjected to storage conditions in the presence of moisture, the following results are obtained:

Two pyramidal-shaped piles, eight feet high and fourteen feet in diameter at the base, are formed and covered with black polyethylene sheets. One pile is formed with passivated briquettes, and the other with unpassivated briquettes. The temperatures within the piles are observed by placing thermocouples in the piles at heights of 3 feet and 5 feet above the ground and toward the outer edge of the pile. As the temperature record shows, as set forth in the following table, there is little indication of a sudden temperature rise, at least initially.

| | Temperature, ° F. | |
|---|---|---|
| Time in hours after pile formation | Lower thermocouple | Upper thermocouple |
| 0 | 120 | 144 |
| 15¼ | 131 | 198 |
| 21¾ | 155 | 185 |
| 38½ | 180 | 190 |

After about 45 hours it is noticed in the untreated pile that the polyethylene toward the top of the pile, at a point away from the wind, begins to burn. Two hours later, temperatures of 600–700° F. are recorded on both thermocouples. However, briquettes at the outer bottom edge of the pile are quite cold, close to freezing, and the outer briquettes of the upper part of the pile are only warm to the touch. A blue flame is observed at the point where the plastic first burned. The fire is quickly extinguished by spreading the pile. The briquettes are glowing red in this area, about 1200–1400° F. The temperature is intense in the center of the pile and diminishes toward the edge of the pile.

In contrast, however, there is no indication of further temperature rise, or of burning, in the pile of treated briquettes.

The tremendous advantages achieved by the passivation technique are indeed apparent.

It will be understood that the specific method described, and the products produced, can be modified to some extent with departing the spirit and scope of the present invention.

Having described the invention, what is claimed is:

1. A process for passivating a highly reactive reduced iron ore from a direct iron ore reduction process which comprises heating the ore in an atmosphere having an oxidation potential sufficient to form a thin wustite coating on the surface of the ore and quenching and maintaining the ore in an inert atmosphere within a temperature range of from about 400° F. to about 1100° F. for a time sufficient to disproportionate at least about 35 percent of said wustite coating, whereby a protective film of inverse spinel of magnetite is formed.

2. The process of claim 1 wherein the heating step is conducted at temperatures ranging from about 1200° F. to about 1600° F.

3. The process of claim 1 wherein the quenching and maintaining step is conducted at temperatures ranging from about 600° F. to about 800° F.

4. The process of claim 1 wherein the reduced iron ore is one obtained from a fluidized iron ore reduction process.

5. As an article of manufacture, a protectively surface filmed reduced iron ore obtained in accordance with the process of claim 1.

6. The article described in accordance with claim 5 wherein the film ranges in thickness from about 20 A. to about 10,000 A.

References Cited

UNITED STATES PATENTS

| 1,787,977 | 1/1931 | Fahrenwald | 148—6.35 |
| 2,768,916 | 10/1956 | Seabold et al. | 148—6.35 |

FOREIGN PATENTS

| 760,166 | 10/1956 | Great Britain | 148—6.35 |

RALPH S. KENDALL, Primary Examiner

U.S. Cl. X.R.

75—21